(12) United States Patent
Nivens, Jr. et al.

(10) Patent No.: US 7,313,955 B2
(45) Date of Patent: Jan. 1, 2008

(54) LIQUID FLOW METER

(75) Inventors: Kirk N. Nivens, Jr., Black Creek, GA (US); Kirk Nathan Nivens, Black Creek, GA (US)

(73) Assignee: City Meter, Inc., Orangeburg, SC (US)

( * ) Notice: Subject to any disclaimer, the term of this patent is extended or adjusted under 35 U.S.C. 154(b) by 0 days.

(21) Appl. No.: 11/626,891

(22) Filed: Jan. 25, 2007

(65) Prior Publication Data

US 2007/0119247 A1    May 31, 2007

Related U.S. Application Data

(63) Continuation-in-part of application No. 11/129,840, filed on May 16, 2005, now Pat. No. 7,181,964.

(51) Int. Cl.
*G01F 3/24* (2006.01)
(52) U.S. Cl. ........................................ 73/217
(58) Field of Classification Search ............... 73/217, 73/861.73, 861.75, 861.77, 861.78, 861.79; 138/39, 118; 285/132.1; 210/170, 195; 405/36
See application file for complete search history.

(56) References Cited

U.S. PATENT DOCUMENTS

| | | | |
|---|---|---|---|
| 4,275,291 A | 6/1981 | Feller | |
| 4,306,457 A | 12/1981 | Fukui et al. | |
| 4,553,433 A | 11/1985 | Hicks | |
| 4,838,731 A | 6/1989 | Gavin | |
| 4,848,164 A | 7/1989 | Quarve et al. | |
| 6,217,760 B1 | 4/2001 | Bovington | |
| 6,487,919 B1 | 12/2002 | Edwards | |
| 6,503,392 B1 | 1/2003 | Tyson | |
| 6,789,434 B2 | 9/2004 | Peterson | |
| 7,181,964 B2 * | 2/2007 | Nivens et al. | ................ 73/217 |

* cited by examiner

*Primary Examiner*—Jewel Thompson
(74) *Attorney, Agent, or Firm*—Robert G. Weilacher; Smith, Gambrell & Russell

(57) ABSTRACT

A liquid flow meter is disclosed including a compartment enclosure formed from an upper case part and a lower case part, the lower case part containing a volumetric measuring container having a specified fluid volume capacity, mounted upon a rotatable pivot having an axis of rotation and having a counterbalance weight. The axis of rotation of the volumetric measuring container being determined by location of said rotatable pivot. The moment created by the counterbalance weight about the axis of rotation maintains the static filling rotational position until the specified volume capacity is achieved. An influent port is formed in the upper case part for directing liquid flow approximately vertically into the approximate center of said volumetric measuring container. The lower case part has a sloped bottom and flumage to receive flow discharge of the volumetric measuring container and directs the liquid volume to an effluent port.

22 Claims, 8 Drawing Sheets

LIQUID FLOW METER

REFERENCE TO A RELATED APPLICATION

This application is a continuation-in-part of my copending application Ser. No. 11/129,840 filed May 16, 2005 now U.S. Pat. No. 7,181,964, which is relied on and incorporated herein by reference.

FIELD OF THE INVENTION

The present invention relates to the measurement of liquid flow through the use of a volumetric mass balance and more specifically to an apparatus for the measurement of gravity open channel flow of nonhomogeneous liquids containing suspended matter, solids, stringy materials, oils, greases and waxes. In a further aspect, the present invention relates to a method for measurement of liquid flow using the apparatus herein described.

DESCRIPTION OF PRIOR ART

The measurement of liquid flow under pressure in enclosed pipes has historically been performed through the use of turbine meters, disc meters, piston meters, Venturi (orifice) meters and pitot tubes. The principal of the Venturi meter was discovered in about 1791 by engineer J. B. Venturi based upon the conservation of energy equations previously developed by Bernoulli for incompressible liquid flow, and was first practically applied by Clemens Herschel in 1887. These meters utilize the liquid pressure differential and positive displacement properties of the liquid to drive the measurement devices and are only effective when the liquid is homogeneous and contains no debris or other materials which may clog or obstruct the measuring device. Suspended matter, solids, stringy material, debris, oils, greases, or other materials contained in the liquid stream render these devices inaccurate and ineffective, or cause complete meter failure through blockage.

The methods of prior art available for measurement of gravity open channel flow include notched weirs of various shapes, Parshall flumes, radar and sonic meters. The formulae for calculation of flow over a rectangular weir was first developed in 1823 by Francis, but required a head of one half foot or more for accuracy. Rehbock of Germany refined the formulae in 1912. Flow formulae for accurate calculation of flow over weirs of various shapes have since been developed. Weirs require a quiescent upstream flow channel for accurate measurement of flows. This quiescent flow zone requirement for accurate operation of weirs as liquid flow measurement meters causes solids contained within waste streams to settle behind the weir. Soil and organic matter collected behind the weir quickly interferes with the accuracy of the weir. A weir's required quiescent zone with low flow velocities provides unscoured wall surface areas which tend to collect and retain floating oils, greases and waxes. The accumulations of solids behind weirs and encrustation of upstream surfaces make them unsuitable for reliable measurement of untreated wastewater. Weirs require an external power source for recording flow, another factor which causes their dismissal as a low cost flow measurement metering device. Liquid surface elevation measurements for weirs require a flow stream contacting float assembly or more expensive electronic surface elevation sensing and recording devices.

Sonic meters, radar meters, magnetic meters and Parshall flumes have been demonstrated to be effective in the measurement of nonhomogenous liquids and liquids containing debris or other materials which might clog the other types of flow measurement devices. Sonic and radar meters operate as electronic sonar, transmitting a sonic wave or radar signal through the pipe wall, receiving a returned signal indicating water surface depth in the pipe and tracing particulate matter movement through the pipe for the purpose of determining flow velocity. The cross sectional area of the liquid flow and velocity determined allows calculation of the flow volume through a mathematically programmed algorithm. Sonic and radar meters have a high first cost due to their electronic complexity and require a continuous external power source for operation.

The current technology relating to Parshall flumes and its variants, including a simply contracted opening, are the most widely used methods of measurement of open channel flow for liquids containing suspended matter, solids, stringy materials, oils, greases and waxes. Parshall flumes and its variants require an external power source for recording flow. The measured fluid surface level at one point up stream of the device allows calculation of the flow quantity. An algorithm, either electronically or mechanically calculates total flow. Liquid surface elevation measurements for flumes require a flow stream contacting a float assembly or more expensive electronic surface elevation sensing device. Due to high initial cost and a required continuous external power source, Parshall flumes and their variants, while the currently time proven method of choice, are used primarily for metering large wastewater flows wherein the costs to provide the equipment, operate and maintain the equipment are offset by the derived flow information.

Externally powered flow recording devices are subject to disruption and for this reason, are not consistently reliable and dependable. The many parts of flow recorders for powered electronic or powered mechanical flow totalizers make them expensive to provide, operate and maintain. Present published technology does not teach a means for the measurement of liquids containing debris and other materials in open channel gravity flow liquid streams without the requirement for an external power source to measure and record these flows.

The present state of the published art does not teach the utilization of a mass balance mechanism for the measurement of gravity liquid open channel flow. Present published art does not teach the utilization of a mass balance mechanism for the measurement of liquids containing a mixture of suspended solids, oils, greases or waxes as contained in wastewater or other slurries.

The measurement of liquids containing wastewater or other slurries has historically been difficult to accurately accomplish due to the propensity of such liquids to foul the measurement mechanism. Lumps, stringy, granular or adhering matter tends to obstruct the measuring mechanism of the close tolerances required for the accurate performance of state of the art turbine meters, disc meters, piston meters, Venturi meters, or pitot tubes. Such liquids are also often corrosive. Naturally occurring decay of the wastewater often creates corrosive or explosive gas mixtures. It is therefore desirable to physically separate the registering mechanical counter from the deleterious effects of exposure to the liquid measured or the gasses created by the natural decay of such liquids.

U.S. Pat. No. 4,306,457, issued Dec. 21, 1981, illustrates one form of liquid flow meter, wherein a magnet is affixed to the rotatable impeller shaft. The magnet, placed in proximity to a magnet field sensor, induces a signal as the impeller shaft rotates to electronically count and tally the impeller rotations thereby allowing physical isolation of the metering mechanism from the counter mechanism.

Another form of flow meter utilizing shaft mounted magnets is disclosed by U. S. Pat. No. 4,275,291 issued Jun. 23, 1981. This patent discloses a first magnet affixed to the rotatable impeller shaft and a second magnet placed in proximity to the first magnet, but outside the liquid flow chamber. Rotation of the second magnet is induced by the rotation of the first magnet. The rotating field generated by the second magnet generates an electrical signal used to provide a read out of flow volume.

Still another form utilizing shaft mounted magnets is illustrated by U.S. Pat. No. 4,553,433, issued Nov. 19, 1985. This patent discloses a gas meter having a first magnet attached to a rotor shaft and a second magnet attached to a indicator shaft, the second magnet being rotatable and magnetically coupled to the first magnet, so as to provide a corresponding rotation of the indicator shaft when the rotor shaft is rotated by the flow of liquid through the meter housing. In this manner a mechanical indicator movement may be driven by magnet coupling to the flow meter shaft.

Present state of the above-mentioned art demonstrates isolation of the liquid flow chamber from the meter counting assembly through the electrical sensing of magnet rotation or by coupling of rotation of the metering assembly to a mechanical counter. The linear coupling of repelling like poles of permanent magnets for actuation of mechanical indicator movements for use in a flow meter are not taught by the current state of the art.

According to currently used technology, a typical residential consumer served with both domestic water and sewer service has the incoming clean water measured through a turbine meter or rotating disc meter for service invoicing purposes. The waste water stream is then assumed to be equal to the supply stream since no viable means exists under the present state of the art to economically measure and record the volume of the waste stream. This has lead to complaints from customers alleging the volumetric charge for wastewater service is unfair because they irrigate their yard or garden, fill swimming pools, wash vehicles or undertake other activities which does not return the supplied water to the sewer system. Customers of wastewater collection and treatment systems without a metered water supply, for example served by a private groundwater well, are invoiced for waste water service on a monthly large flat rate basis. Conversely, the wastewater system operators generally receive more sewer collection system effluent water into their wastewater treatment facilities than total water sold to customers. This differential is commonly referred to as infiltration and inflow (I/I). I/I increases the cost of operations for collection systems through increased pumping costs and collection line cleaning costs due to the soil being washed into the sanitary sewer collection system by the I/I. I/I causes biological treatment process upsets in wastewater treatment plants due to the large flow variations they cause.

The United States Environmental Protection Agency currently estimates 60 percent of I/I is generated from private property. Residential service piping is typically installed on private property when the collection system is installed; or when the residence is constructed. To the residential owner, the service piping is out of sight and out of mind; unless or until it causes their sewer service to fail. As much of the housing stock of America connected to wastewater collection systems approaches 100 years of age, the service piping has exceeded its useful life, has been breached through corrosion or mechanical damage, and allows groundwater, and often surface water, to enter the system undetected and unmeasured.

The United States Environmental Protection Agency has documented and recognized the chronic nature of infiltration and inflow in wastewater collection systems. It has recently adopted a policy of requiring wastewater collection system operators experiencing problems with I/I to adopt and implement a collection system maintenance and operational management (CMOM) program toward control and elimination of sources of I/I. The commercial availability of a simple meter suitable for the measurement of wastewater reliably is, therefore, highly desirable and fulfills an unmet commercial need not disclosed in the prior art. If such a meter could be provided, it would be used to isolate the sources of I/I and thereby lower collection system and treatment system costs, both in terms of capital costs and operational costs.

The "Recommended Standards for Wastewater Facilities", 1990 Edition, published by the Great Lakes Upper Mississippi River Board of State Public Health and Environmental Managers requires all pumps handling raw wastewater to be capable of passing a three inch spherical solid and have no suction or discharge opening less than 4 inches in diameter. Given this pump design criteria, it follows that any fluid meter proposed for use in raw wastewater must meet the same minimum design criteria because the pump will receive only the raw wastewater discharged to it by the collection system.

SUMMARY OF THE INVENTION

The present invention relates to a liquid flow meter, comprising: a compartment enclosure formed from an upper case part and a lower case part, wherein the lower case part contains a volumetric measuring container having a specified fluid volume capacity, mounted upon a rotatable pivot having an axis of rotation, the axis of rotation of the volumetric measuring container is determined by location of said rotatable pivot.

The volumetric measuring container has a counterbalance weight affixed thereto proximate to the axis of rotation, and a static filling rotational position of the volumetric measuring container is limited by a stop integral with the upper case part.

In operation, a moment created by the counterbalance weight about the axis of rotation maintains the static filling rotational position until the specified volume capacity is achieved. There are a plurality of bearing guides affixed to the lowercase part of the compartment enclosure for supporting the rotatable pivot. An influent port is formed in the upper case part for directing liquid flow into the volumetric measuring container through the compartment enclosure and oriented parallel to the main axis of the upper case part, and the influent port is located to deliver flow approximately vertically into the approximate center of said volumetric measuring container.

An effluent port is located in the lower case part for discharge of liquid volume of the volumetric measuring container. The lower case part has a sloped bottom and flumage to receive flow discharge of the volumetric measuring container and to direct the liquid volume to the effluent port.

A means for counting the number of discharge cycles of the volumetric container is also provided. The compartment enclosure for the volumetric measuring container is formed by plastic molding an upper case part and a lower case part.

Suitable plastics are polyvinyl chloride or other synthetic resins as will be apparent to those skilled in the art.

The meter is provided with sidewall reinforcement ribs to prevent sidewall deflection when the meter is buried in the ground. The ribs protect against the measuring container being obstructed in movement.

The lower case part is integrally molded with sloped bottom for self draining to the effluent port. The lower case part and upper case part are each integrally molded with a flange for mating engagement.

The influent port has a V-shaped inlet which improves the accuracy of the liquid flow meter.

The lower case has a step that prevents backwash from encroaching under the measuring container. This prevents solids from accumulating under the container.

The upper case part is integrally molded with a plurality of rotation stops determining the rotational position of the static filling position of the volumetric container.

The upper case part is integrally molded with a calibration and sampling port allowing installed meter calibration testing and sampling of the effluent.

In addition, the upper case has molded therein bearing retainers which protrude from the upper case down into the lower case half to enclose the slotted bearing guides. This prevents dirt and debris entry into or onto the bearing.

The invention also relates to a method for measuring waste water flow, comprising flowing waste water into a compartment enclosure containing a volumetric container having a specified fluid volume capacity mounted upon a rotatable pivot having an axis of rotation, creating a moment differential by a counterbalance weight and thereby maintaining said volumetric bucket assembly against a rotation stop limit affixed to the compartment enclosure determining rotational position of the static filling position of volumetric bucket assembly. The volumetric container is filled by flow through an influent conduit in an upper part of the compartment enclosure until moment of the specified liquid capacity results in a balanced moment about the rotational pivot axis. The operation continues by flowing further fluid flow into the volumetric container to result in a moment imbalance causing initiation of rotation of the volumetric container about the rotational pivot axis.

The initiation of rotation results in flow of fluid contained within the volumetric container over an elongated pouring lip of the volumetric container.

The flow of fluid over the elongated pouring lip results in a shift of the centroid of mass of the fluid contained within the volumetric container, which increases the moment imbalance about the rotatable pivot axis.

Increasing the moment imbalance about the rotatable pivot axis accelerates rotation of the volumetric container until the discharge position rotational stop limit impacts.

Impacting of the volumetric container upon the rotational position limit of discharge position stop causes inertia momentum flow of fluid contained within the volumetric container and this inertia momentum flow of fluid contained within the volumetric container causes rapid discharge of fluid contained by the volumetric container.

A magnet affixed to the upper edge of the counterbalanced side of the volumetric container opposes and applies a force on another magnet attached to a mechanical counter to increment the counter. Alternatively, a magnet affixed to the upper edge of the counterbalanced side of the volumetric container interacts with a magnetic reed switch of induction coil to electronically detect the volumetric container discharge cycle and increment an electronic counter. Both methods counting the total number of cycles to provide a total running cycle count. The total volume flow through the meter is determined by multiplying the total cycle count times the specified discharge volume per cycle.

A lower part of the compartment enclosure buffers pulsed fluid flow of the volumetric container discharge channeling fluid into the effluent port thereby minimizing fluid remaining in the compartment enclosure. After that, the volumetric container is rapidly returned to the rotational stop in the static filling position by a moment imbalance caused by the counterbalance weight upon emptying the volumetric container.

OBJECTS AND ADVANTAGES

Accordingly, several objects and advantages of the present invention are:

(a) to provide a liquid meter suitable for use in the measurement of raw wastewater;

(b) to provide a liquid meter which does not require an external power source;

(c) to provide a liquid meter simple in design with few moving parts;

(d) to provide a liquid meter which measures wastewater containing suspended solids, oils greases and waxes without substantially affecting meter accuracy;

(e) to provide a liquid meter easily mass produced at low cost;

(f) to provide a liquid meter with a water tight enclosure to prevent environmental concerns;

(g) to provide a liquid meter requiring little or no maintenance;

(h) to provide a liquid meter suitable for burial in the ground;

(i) to provide a liquid meter which is tamper proof;

(j) to provide a liquid meter sealed from the flow summation mechanism;

(k) to provide a liquid meter easily read by utility operators;

(l) to provide a liquid meter suitable for installation in gravity sewer service systems;

(m) to provide a liquid meter protectable from normal traffic impact damage;

(n) to provide a liquid meter manufactured primarily by molding;

(o) to provide a liquid meter scalable in size to accommodate various flow capacities;

(p) to provide a liquid meter highly resistant to corrosion;

(q) to provide a liquid meter the enclosure of which is self draining;

(r) to provide a liquid meter with smooth interior flow pathways;

(s) to provide a liquid meter with minimal head losses;

(t) to provide a liquid meter adjustable for flow calibration;

(u) to provide a liquid flow meter capable of providing a calibrated dosage volume per unit discharge cycle;

(v) to provide a liquid flow meter capable of passing a three inch diameter spherical solid;

(w) to provide a liquid flow meter having influent and effluent openings no smaller than 4 inches in diameter; and (x) to provide a liquid flow meter fail safe in design.

Still further objects and advantages will become apparent from a consideration of the ensuing description and drawings. Objects and advantages disclosed above are not intended to limit the meter usage to wastewater only. Other uses will be apparent to those skilled in the arts.

DETAILED DESCRIPTION OF INVENTION

The present invention relates to the construction and manufacture of an entirely new and unique method of assembly of a liquid flow meter. The meter is economically and simply constructed, has but one moving part as the measuring assembly, uses no external power source, operates entirely through the use of gravity, is capable of passing 3 inch spherical solids, suspended solids, oils, greases, waxes and is therefore useful in measuring wastewater flow. It provides an economical and cost effective means of measuring wastewater flow from every wastewater connection to a sewer collection system and meets the design standards for minimal opening sizes. This ability to measure allows the customer to be invoiced for the measured flow, thus addressing the customer's claims with respect to over-billing, and conversely allows the system operator to invoice for all flows including infiltration and inflow. Customers receiving invoices for more wastewater than water supplied will have a direct motivation to repair or replace defective service piping on their private property. Replacement of defective service piping will allow the wastewater collection and treatment systems to operate more efficiently and effectively, and help eliminate system operational problems and violations caused by large flow variations. Alternatively, wastewater collection and treatment system operators will be in a position to receive income directly proportional to the wastewater quantity produced by each customer's connection to their sewer collection system.

The present invention is scalable, therefore allowing different meter sizes for differing flow quantities. Larger meters would be particularly useful in the study toward elimination of infiltration and inflow in wastewater collection systems. Historically, run time meters at pump stations have been used to estimate the flows by applying the run time to the average pumping capacity, for lack of a more accurate flow measurement method. Such studies invariably require data adjustment due to relay failures, check valve failures, pump failures and other causes. Steady state flow from any pump differs from priming (or startup) flow, causing such measurement methods to be best estimates of actual flows.

A reliable, accurate and cost effective means of measuring the flow of liquids containing mixtures of solids, oils, greases and waxes is therefore highly desirable and fulfills a currently unmet commercial need. The present invention is intended by applicants to meet this identified need and will be commercially desirable for other commercial and industrial applications requiring measurement of such fluid mixtures. The meter design is "fail safe" in that if the meter fails to function as designed, a clear opening is provided to allow the passage of all flow including a 3 inch diameter spherical solid.

Figure 1:
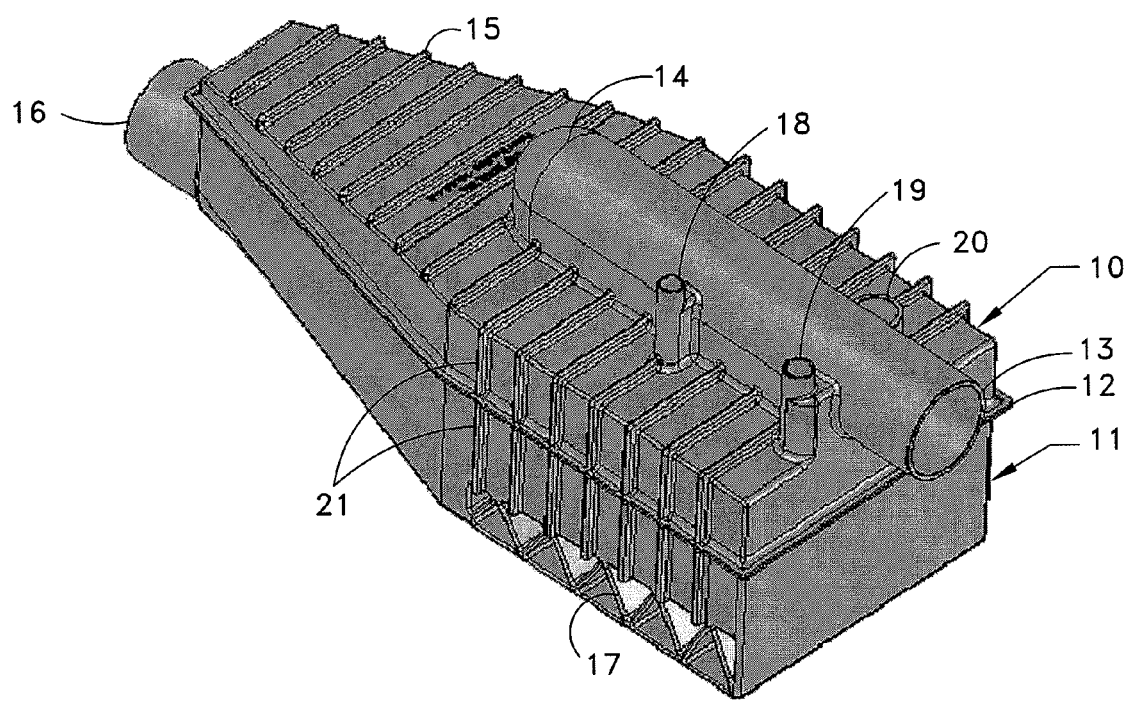
FIG. 1 is an isometric view of the assembled liquid flow meter of the invention.

Referring to the accompanying drawings, FIG. 1 shows the liquid flow meter (1) of the invention, the shape of the outer enclosure thereof is important to the hydraulic head at which the meter will function, with wider enclosures allowing lower hydraulic head losses through the flow metering assembly. The liquid flow meter is formed of an upper case assembly (10) and a lower case assembly (11). The upper case assembly is provided with three ports: a first port called a meter influent pipe (13) which receives the incoming fluid stream and can be fitted with a female coupling connection for pipe flow to be metered. A second port (18) is a calibration and sampling port. This port allows the meter to be accessed from the ground surface to verify calibration and to acquire wastewater samples for laboratory analysis. A third port is a flushing port (19) and provides a connection for field flushing the meter assembly with water.

Figure 2:
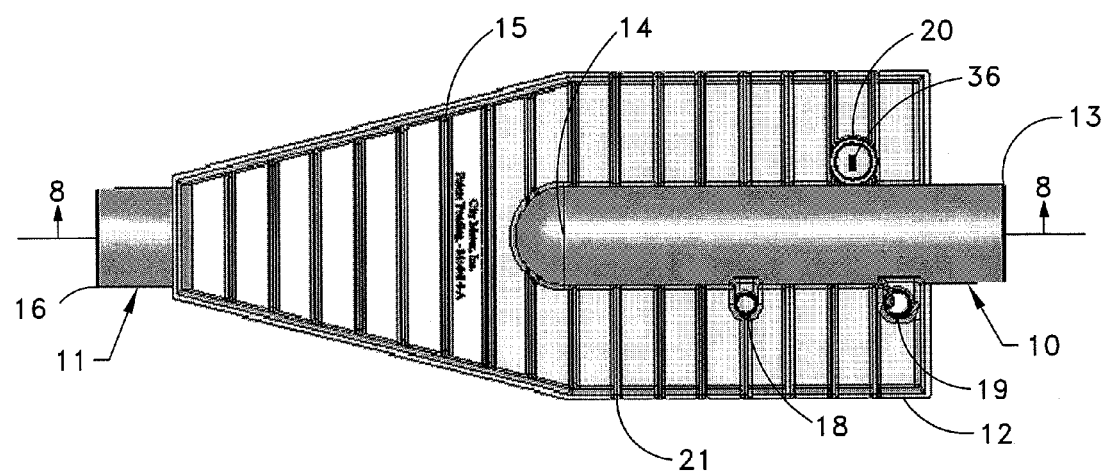
FIG. 2 is a top view of the assembled liquid flow meter of the invention.

As shown the meter influent pipe (13) is located over the centerline of the meter (1) as shown in FIG. 2 for the purpose of counteracting and distributing the momentum force caused by the inertia of the incoming flow. Effluent outlet pipe (16) is located at the lower end of the lower case assembly (11). Flushing port (19) is located at the higher end of the upper case (10) as shown in FIG. 1.

Upper and lower case mating flanges (12) are provided to enable a tight fit between the upper and lower cases.

The upper case assembly is provided with an overflow bypass volute (14).

Preferably, the upper case is provided with a plurality of horizontal structured reinforcing ribs (15) and a plurality of vertical side wall reinforcing ribs (21) on the exterior of the upper case. The lower case can also be equipped with such reinforcing ribs. These ribs help to prevent sidewall deflection which might occur when the meter is buried in the ground.

The lower case (11) can be constructed so as to include lower case trusses (17) which are included for the purpose of eliminating unnecessary material.

In the preferred embodiment, a meter counter cell or other counting device (20) is molded into the exterior of the upper case assembly (10) for the purpose of housing the cycle counter device as a magnetic reed switch or inductive coil retainer (36), the cycle counter assembly being any suitable commercially available type. See FIG. 2. The cycle counter housing (20) is molded with the upper case assembly (10) of the meter enclosure on one end.

Actuation of the cycle counter assembly is through the upper outer enclosure of the liquid flow meter by convention means. The purpose of sealing the cycle counter assembly (20) is to prevent water, moisture and sewer gasses from contacting the cycle counter assembly, thereby reducing the effects of corrosion upon the cycle counter assembly.

Figure 7:
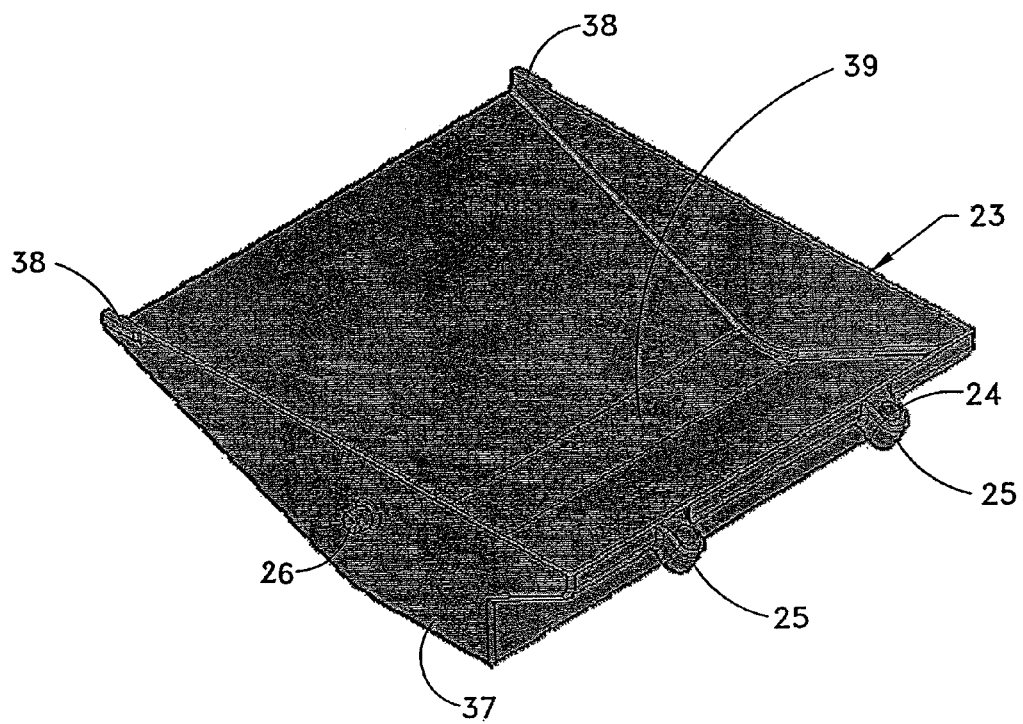
FIG. 7 is an isometric view of the volumetric measuring bucket assembly which is inside the liquid flow meter of the present invention.
Figure 8:
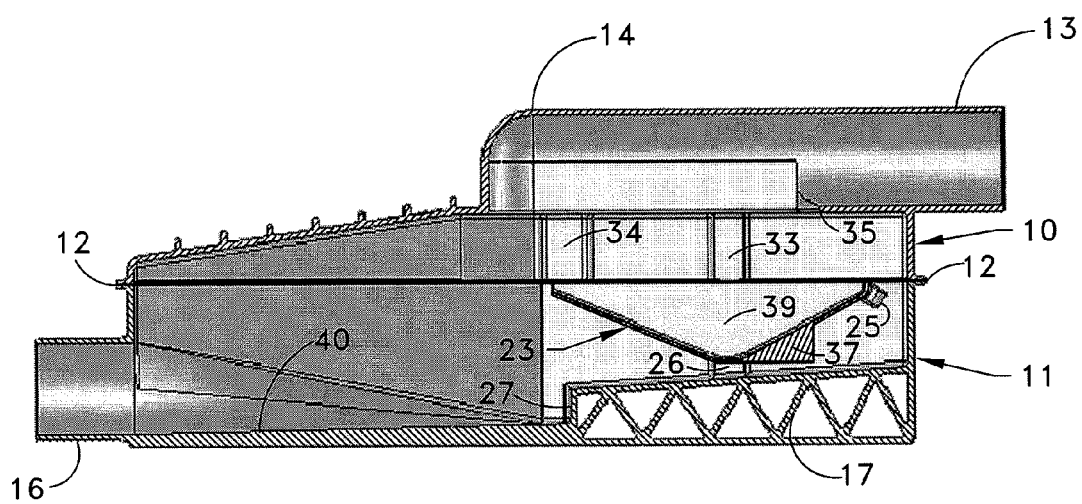
FIG. 8 is a cross-sectional view of the assembled liquid flow meter of the present invention.

Within the said flow meter enclosure, and located in the lower case assembly, is a pivoting volumetric measuring bucket assembly or container (23) (see FIGS. 7 and 8). The bucket assembly is proportioned to contain a specific volume and proportioned to have a long side and a short side relative to the horizontal axis about which it rotates. The short side of the volumetric metering bucket has the counterbalance mass (37) so that it is counterweighted to create a moment about the pivot axis in excess of the moment about the horizontal pivot axis of the bucket caused by the long leg of the bucket and the fluid it contains until the specific volume is reached, were upon, the moment created by the weight of the volume of the fluid and the longer leg of the bucket overcomes the moment caused by the bucket counterweight, and the pivoting measuring bucket begins to rotate. As the pivoting measuring bucket begins to rotate, the center of gravity of the fluid and the suspended matter within the fluid within the bucket transfers away from the pivot, increasing the moment imbalance, and causing the bucket to be accelerated downward, causing the bucket to rapidly dump its specific volume contents including any solids, oils, grease or suspended matter into the lower case assembly in the direction of the effluent outlet pipe (16). The dumping cycle motion of the bucket is sensed through the meter enclosure through the use of suitable devices as described which are commonly commercially available. The counterbalance mass (37) of the short leg of the bucket returns the emptied bucket to the unfilled position, allowing the cycle to be repeated.

Volumetric metering bucket impact dissipators (38) are provided to spread the bucket impact loadings over a larger area to slow down meter bucket wear at the point of impact on the upper case bucket stop (34).

Figure 3:
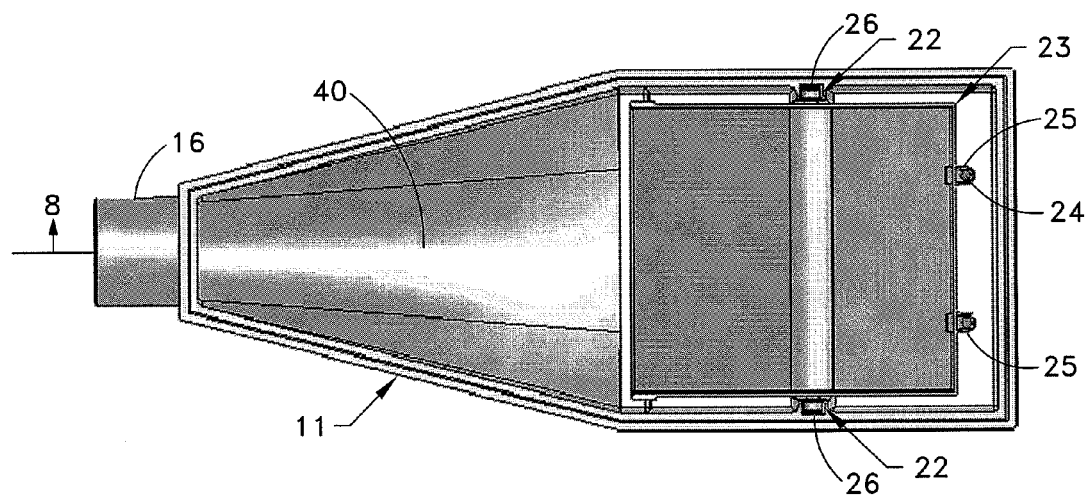
FIG. 3 is a top view of the lower case of the liquid flow meter and the measuring bucket assemblies of the present invention.

The pivots (36) of the bucket assembly (23) are each supported by a bearing assembly (22) supported by a lower case bearing guide (26) of assembly (11). A permanent magnet assembly (24) is provided and fitted into a receiving cup or holder therefor (25); see FIG. 3 and FIG. 6.

Figure 5:
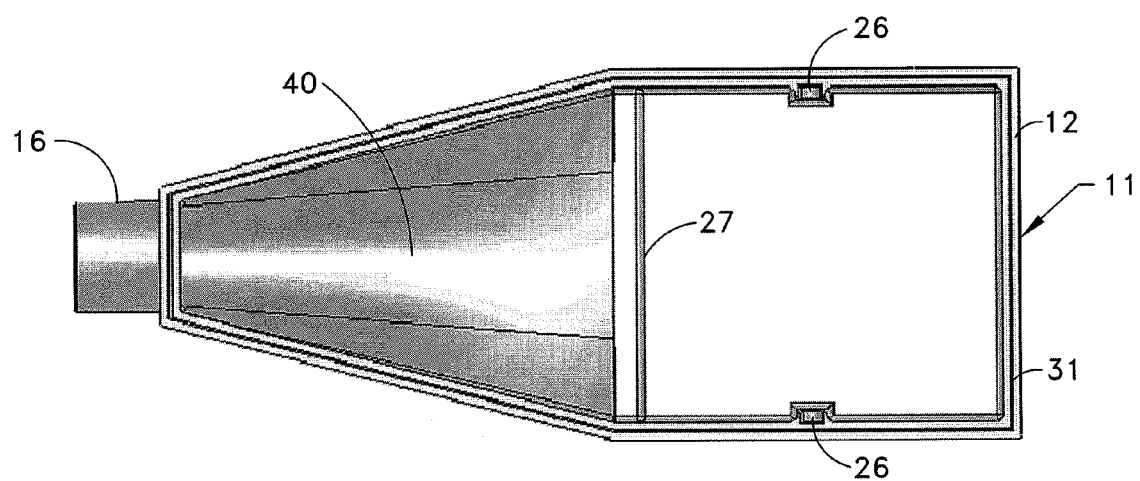
FIG. 5 is the top view of the lower case assembly.

FIG. 5 shows that the lower case is provided with a lower case elevation step (27).

Figure 6:
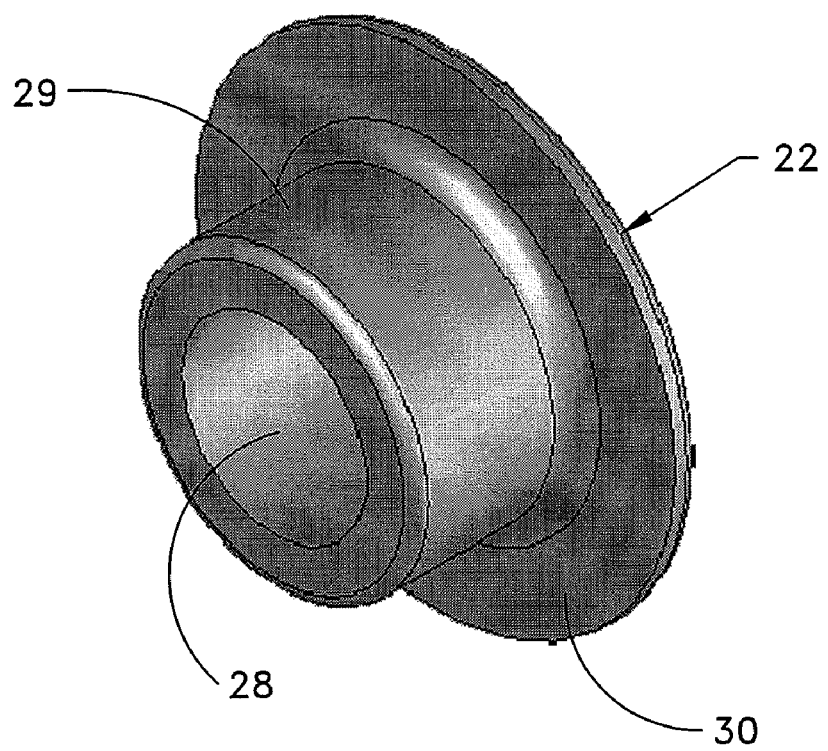
FIG. 6 is an isometric view of the bearing assembly.

As shown in FIG. 6, the bearing assembly (22) is provided with through opening (28) to receive the bucket pivot (36). Surface (29) indicates the lower case-to-bearing contact surface. The bearing has a bearing seal face (30) that is in contact with a side wall of the lower case. FIG. 5 also shows the weld bead material (31) forming part of the lower case flange and the weld bead material (32) forming a part of the upper case flange. An outlet flume (40) is provided to insure efficient flow out of the meter effluent pipe (16).

Figure 4:
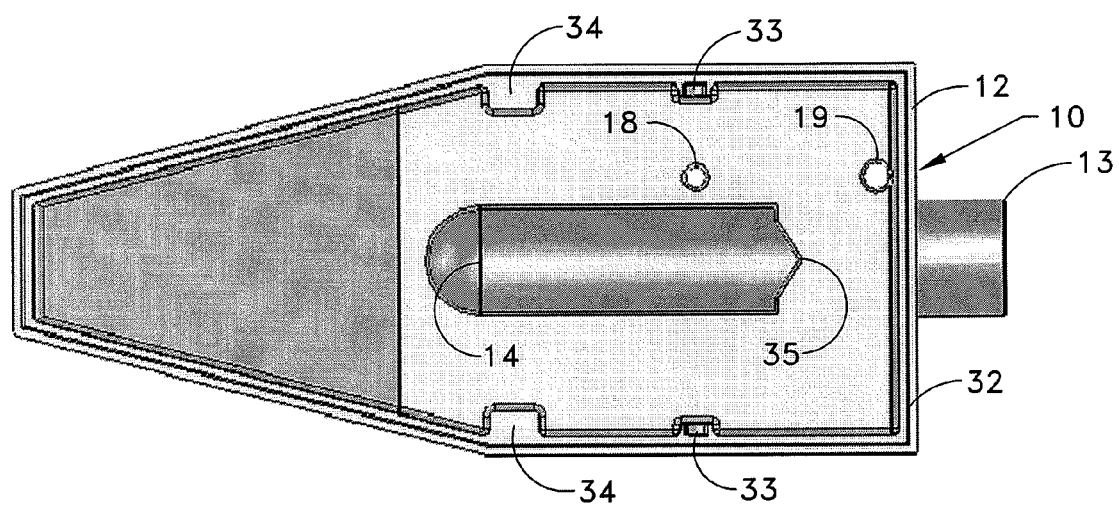
FIG. 4 is the bottom view of the upper case assembly.

FIG. 4 shows additional details of the interior of the upper case. The upper case has integrally molded a bearing retainer (33). The upper case also has two stops (34) for the volumetric metering bucket to limit the movement of said bucket.

The overflow bypass volute (14) can also be seen in FIG. 4. A shaped inlet flow modifier (35) is provided to enable better flow into the metering bucket (23).

The preferred material for construction of the enclosure and the bucket is polyvinyl chloride plastic, a material widely used for the conveyance of wastewater and desirable due to its low surface friction properties and its resistance to corrosion in wastewater environments. Other synthetic plastic materials may be used to achieve similar results as will be apparent to those skilled in the art.

Installation of the meter assembly in the gravity flow conduit requires that it be set to the grade, level across the axis of the pivot assembly, and longitudinally level to insure the meter enclosure fully drains with a velocity sufficient to transport suspended matter. Typically the longitudinal grade of the bottom of the lower enclosure will be sufficient to cause a minimum liquid flow velocity greater than 2 feet per second within said lower enclosure.

When installed in a typical sewer service lateral, between for example, a residence and a gravity sewer collection system, the entire assembly will be installed below the ground surface with only the registering tallying cycle counter, the flushing attachment fitting and the optional sample/calibration port accessible from the surface. The meter registering tally cycle counter enclosure shall be protected from normal surface traffic damage by a state of the art meter box with lid. It is envisioned the registering tallying cycle counter will be read monthly as is common in the industry for the reading of similar registers for water metering services. The strength of the enclosure assembly and appurtenances shall be sufficient to withstand the soil and traffic overburdens. The mechanical cycle counter enclosure may be produced in varying lengths to accommodate varying depths of burial. In the preferred embodiment, an underground rated two conductor copper wire is used to connect the magnetic reed switch or inductive coil to the electronic meter cycle counter. The flushing port will be field extendable during installation to allow ease of surface access.

Further modification and variations will be apparent to those skilled in the art from the foregoing and are intended to be encompassed by the claims appended hereto.

We claim:

1. A liquid flow meter, comprising:
a compartment enclosure formed from an upper case part and a lower case part,
said lower case part containing a volumetric measuring container having a specified fluid volume capacity, mounted upon a rotatable pivot having an axis of rotation,
said axis of rotation of said volumetric measuring container being determined by location of said rotatable pivot,
said volumetric measuring container having a counterbalance weight, and a static filling rotational position of said volumetric measuring container limited by a stop integral with the upper case part,
a moment created by said counterbalance weight about said axis of rotation maintains said static filling rotational position until said specified volume capacity is achieved,
a plurality of bearing guides affixed to the lower case part of said compartment enclosure for supporting said rotatable pivot,
an influent port formed in said upper case part for directing liquid flow into said volumetric measuring container through said compartment enclosure,
said influent port located to deliver flow approximately vertically into the approximate center of said volumetric measuring container,
an effluent port located in said lower case part for discharge of liquid volume of said volumetric measuring container,
said lower case part having sloped bottom and flumage to receive flow discharge of said volumetric measuring container and to direct said liquid volume to said effluent port,
and means for counting the number of discharge cycles of the said volumetric container.

2. The liquid flow meter according to claim 1, wherein said compartment enclosure for said volumetric measuring container is formed by plastic molding an upper case part and a lower case part.

3. The liquid flow meter according to claim 1, wherein said lower case part containing a plurality of rotating pivot bearings.

4. The liquid flow meter according to claim 1, wherein said lower case part is molded with said effluent port.

5. The liquid flow meter according to claim 1, wherein said lower case part is integrally molded with sloped bottom for self draining to said effluent port.

6. The liquid flow meter according to claim 1, wherein said lower case part is integrally molded with a flange for mating to said upper enclosure part.

7. The liquid flow meter according to claim 1, wherein said upper case part is integrally molded with a said influent conduit.

8. The liquid flow meter according to claim 1, wherein said upper case part is integrally molded with a plurality of said rotation stops determining the rotational position of said static filling position of said volumetric container.

9. The liquid flow meter according to claim 1, wherein said upper case part incorporates a plurality of said vertically adjustable rotation stops determining the rotational position of the said static filling position of said volumetric container.

10. The liquid flow meter according to claim 1, wherein said upper case part is integrally molded with said flushing port allowing flushing of the interior of the said liquid flow meter.

11. The liquid flow meter according to claim 1, wherein said upper case part is integrally molded with a flange for mating to the lower enclosure part.

12. The liquid flow meter according to claim 1, wherein the material of construction for meter is polyvinyl chloride plastic or other synthetic plastic.

13. The liquid flow meter according to claim 1, wherein said volumetric container is molded.

14. The liquid flow meter according to claim 1, wherein said volumetric container is molded to include the counterbalance weight.

15. The liquid flow meter according to claim 1, wherein said volumetric container and counterbalance weight are molded separately and joined during meter assembly.

16. The liquid flow meter according to claim 1, wherein the material of construction for said counterbalance weight is a castable chemical resistant and dense material.

17. The liquid flow meter according to claim 1, further comprising a clear glass or other clear plastic material convex lens attached and sealed to the plate lid closure of mechanical counter water tight box for reading of a art meter count register.

18. The liquid flow meter according to claim 1, wherein the counting means is an inductance coil and electronic counter circuitry for use in electronic cycle measurement.

19. The liquid flow meter according to claim 1, wherein the counting means is a reed switch or other magnetically operated switch for use in electronic cycle measurement.

20. The liquid flow meter according to claim 1 which incorporates a waste water sampling port to allow small amounts of waste water to be removed for laboratory analysis.

21. A method for measuring waste water flow, comprising flowing waste water into a compartment enclosure containing a volumetric container having a specified fluid volume capacity mounted upon a rotatable pivot having an axis of rotation, creating a moment differential by a counterbalance weight and thereby maintaining said volumetric container against a rotation stop limit affixed to said compartment enclosure determining rotational position of said static filling position of volumetric container, filling said volumetric container by flow through an influent conduit in an upper part of said compartment enclosure until moment of said specified liquid capacity results in a balanced moment about said rotational pivot axis, flowing further fluid flow into said volumetric container to result in a moment imbalance causing initiation of rotation of the volumetric container about said rotational pivot axis, said initiation of rotation resulting in flow of fluid contained within said volumetric container over an elongated pouring lip of the volumetric container, the flow of fluid over said elongated pouring lip resulting in a shift of centroid of mass of the fluid contained within said volumetric container, the shift in centroid of mass of liquid contained within said volumetric container increasing the moment imbalance about said rotatable pivot axis, increasing the moment imbalance about said rotatable pivot axis to accelerate rotation of said volumetric container until a discharge position rotational stop limit impacts, impacting said volumetric container upon said rotational position limit of discharge position stop to thereby cause inertia momentum flow of fluid contained within the volumetric container, the inertia momentum flow of fluid contained within said volumetric container causing rapid discharge of fluid contained by the volumetric container, a lower part of said compartment enclosure buffering pulsed fluid flow of said volumetric container discharge channeling fluid into said effluent port thereby minimizing fluid remaining in the said compartment enclosure, rapidly returning the volumetric container to the rotational stop in the static filling position by a moment imbalance caused by said counterbalance weight upon emptying said volumetric container, counting the total number of cycles to provide a total cycle count.

22. The method according to claim 21, further comprising:

attaching or molding a permanent magnet into the uppermost portion of said counterbalance weight of said calibrated volumetric container, locating said permanent magnet in proximity to the upper most part of said upper enclosure for said calibrated volumetric container while resting the calibrated container upon said discharge position stop, attaching a second permanent magnet by a rod or tube to the lever of a mechanical counter, orientating the second permanent magnet so that like poles of the said permanent magnets are opposing, locating the said second permanent magnet resting upon the exterior face of the said upper compartment enclosure on coincident centerline with the first permanent magnet location.

* * * * *